(12) United States Patent  
Luong et al.

(10) Patent No.: US 9,106,268 B2  
(45) Date of Patent: Aug. 11, 2015

(54) METHODS AND APPARATUS FOR IMPROVING ACQUISITION FOR NFC LOAD MODULATION

(71) Applicant: QUALCOMM Incorporated, San Diego, CA (US)

(72) Inventors: Le Nguyen Luong, San Diego, CA (US); RaviKiran Gopalan, San Diego, CA (US); Koorosh Akhavan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/736,174

(22) Filed: Jan. 8, 2013

(65) Prior Publication Data

US 2014/0073241 A1   Mar. 13, 2014

Related U.S. Application Data

(60) Provisional application No. 61/700,272, filed on Sep. 12, 2012.

(51) Int. Cl.
*H04B 5/00* (2006.01)
*H04L 7/04* (2006.01)
*H04L 7/10* (2006.01)

(52) U.S. Cl.
CPC .............. *H04B 5/00* (2013.01); *H04B 5/0031* (2013.01); *H04L 7/042* (2013.01); *H04L 7/10* (2013.01)

(58) Field of Classification Search
CPC ...... H04B 5/0037; H04B 5/0031; H04B 5/00; H04B 5/0081; H04B 5/0093; H04B 1/30; H02J 5/005; H02J 7/025
See application file for complete search history.

(56) References Cited

U.S. PATENT DOCUMENTS

| 6,430,519 | B1 | 8/2002 | Tobergte |
| 8,188,787 | B2 | 5/2012 | Wilson et al. |
| 2004/0030364 | A1* | 2/2004 | Bange et al. ................. 607/59 |
| 2006/0038024 | A1 | 2/2006 | Nakadai et al. |
| 2008/0143435 | A1* | 6/2008 | Wilson et al. ................ 329/342 |
| 2008/0304607 | A1* | 12/2008 | Birru ............................. 375/359 |
| 2011/0241837 | A1 | 10/2011 | Suzuki |
| 2012/0128106 | A1 | 5/2012 | Takayama et al. |
| 2012/0134448 | A1* | 5/2012 | Fukuda et al. ................ 375/340 |
| 2012/0252362 | A1 | 10/2012 | Kawata |
| 2012/0252363 | A1 | 10/2012 | Zhang et al. |

FOREIGN PATENT DOCUMENTS

EP   2138961 A1   12/2009

OTHER PUBLICATIONS

International Search Report and Written Opinion—PCT/US2013/058332—ISA/EPO—Jan. 9, 2014.

* cited by examiner

*Primary Examiner* — Edward Urban
*Assistant Examiner* — Mohammed Rachedine
(74) *Attorney, Agent, or Firm* — Charles E. Eggers (57) ABSTRACT

Aspects disclosed herein relate to improving acquisition for NFC load modulation. In one example, a communications device is equipped to monitor at least a complex component of load modulation of a carrier signal, detect, using a NFC technology type specific peak detection scheme, a peak associated with at least the complex component, and determine a presence of a packet beginning pattern based on the detected peak. In an aspect, the packet beginning pattern may be associated with a reception of a packet from a target NFC device.

14 Claims, 8 Drawing Sheets

METHODS AND APPARATUS FOR IMPROVING ACQUISITION FOR NFC LOAD MODULATION

CLAIM OF PRIORITY UNDER 35 U.S.C. §119

The present application for patent claims priority to Provisional Application No. 61/700,272 entitled "METHODS AND APPARATUS FOR IMPROVING ACQUISITION FOR NFC LOAD MODULATION" filed Sep. 12, 2012, and assigned to the assignee hereof and hereby expressly incorporated by reference herein.

BACKGROUND

1. Field

The disclosed aspects relate generally to communications between devices and specifically to methods and systems for improving acquisition for near field communication (NFC) load modulation.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

For near field communication (NFC), a target NFC device may communicate with an initiator NFC device using load modulation, (e.g., modulation of a carrier signal) by switching the load (e.g., the impedance of the Target) on and off Depending on which specification (NFC forum, ISO/IEC, ECMA and etc.) and depending on which modulation type (NFC type A, B, F, etc.), a known pattern/sequence at the beginning of a packet may be called a start of sequence (SoS), a start of frame (SoF), or a start of communication (SoC). Generally, SoS/SoF/SoC have poor auto-correlation property. The current acquisition algorithms are based on envelope detection and exhibit poor performance for detecting SoS/SoF/SoC, especially when the change in amplitude of the envelope is small due to inefficient coupling between a target NFC device antenna and an initiator NFC device antenna.

Thus, improved apparatuses and methods improving acquisition for near field communication (NFC) load modulation may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving acquisition for NFC load modulation. In one example, a communications device is equipped to monitor at least a complex component of load modulation of a carrier signal, detect, using a NFC technology type specific peak detection scheme, a peak associated with at least the complex component, and determine a presence of a packet beginning pattern based on the detected peak. In an aspect, the packet beginning pattern may be associated with a reception of a packet from a target NFC device.

According to related aspects, a method for improving acquisition for NFC load modulation is provided. The method may include monitoring, by an initiator NFC device, at least a complex component of load modulation of a carrier signal. Further, the method may include detecting, using a NFC technology type specific peak detection scheme, a peak associated with at least the complex component. Moreover, the method can include determining a presence of a packet beginning pattern based on the detected peak. In an aspect, the packet beginning pattern may be associated with a reception of a packet from a target NFC device.

Another aspect relates to a communications apparatus for improving acquisition for NFC load modulation. The communications apparatus can include means for monitoring, by an initiator NFC device, at least a complex component of load modulation of a carrier signal. Further, the communications apparatus may include means for detecting, using a NFC technology type specific peak detection scheme, a peak associated with at least the complex component. Moreover, the communications apparatus can include means for determining a presence of a packet beginning pattern based on the detected peak. In an aspect, the packet beginning pattern may be associated with a reception of a packet from a target NFC device.

Another aspect relates to an apparatus for NFC communications. The apparatus can include an acquisition module coupled to at least one of a memory or a processor. The acquisition module may be configured to monitor at least a complex component of load modulation of a carrier signal. Further, the acquisition module may be configured to detect, using a NFC technology type specific peak detection scheme, a peak associated with at least the complex component. Moreover, the acquisition module may be configured to determine a presence of a packet beginning pattern based on the detected peak. In an aspect, the packet beginning pattern may be associated with a reception of a packet from a target NFC device.

Another aspect relates to a computer program product, which can have a computer-readable medium comprising code for monitoring, by an initiator NFC device, at least a complex component of load modulation of a carrier signal. Further, the computer-readable medium can include code for detecting, using a NFC technology type specific peak detection scheme, a peak associated with at least the complex component. Moreover, the computer-readable medium can include code for determining a presence of a packet beginning pattern based on the detected peak. In an aspect, the packet beginning pattern may be associated with a reception of a packet from a target NFC device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, an initiator NFC device may be configured to perform interactions with various different target NFC devices. These interactions may be performed using load modulation, by a target NFC device, of a carrier signal that is supplied by an initiator NFC device. Accordingly, efficient signal acquisition may assist an initiator NFC device with performing said various interactions. As described herein, efficient acquisition algorithms allow an initiator NFC device to analyze the load modulation as a complex signal so as to utilize the phase information that may indicate phase discontinuity when the load is switching on and off A matched filter may be applied to the complex signal to maximize signal-to-noise ratio (SNR) but still minimize the hardware complexity. In an aspect, the matched filter may have filter coefficients in binary form $\{+1, -1\}$. Using the matched filter information, the acquisition algorithms allow the initiator NFC device to detect the presence of a packet and/or symbol timing. In another aspect, an acquisition algorithm may also provide an initial channel estimate for a demodulation module. As such, the acquisition algorithms described herein in provides schemes to overcome the poor auto-correlation property of the SoS/SoF/SoC.

Figure 1:
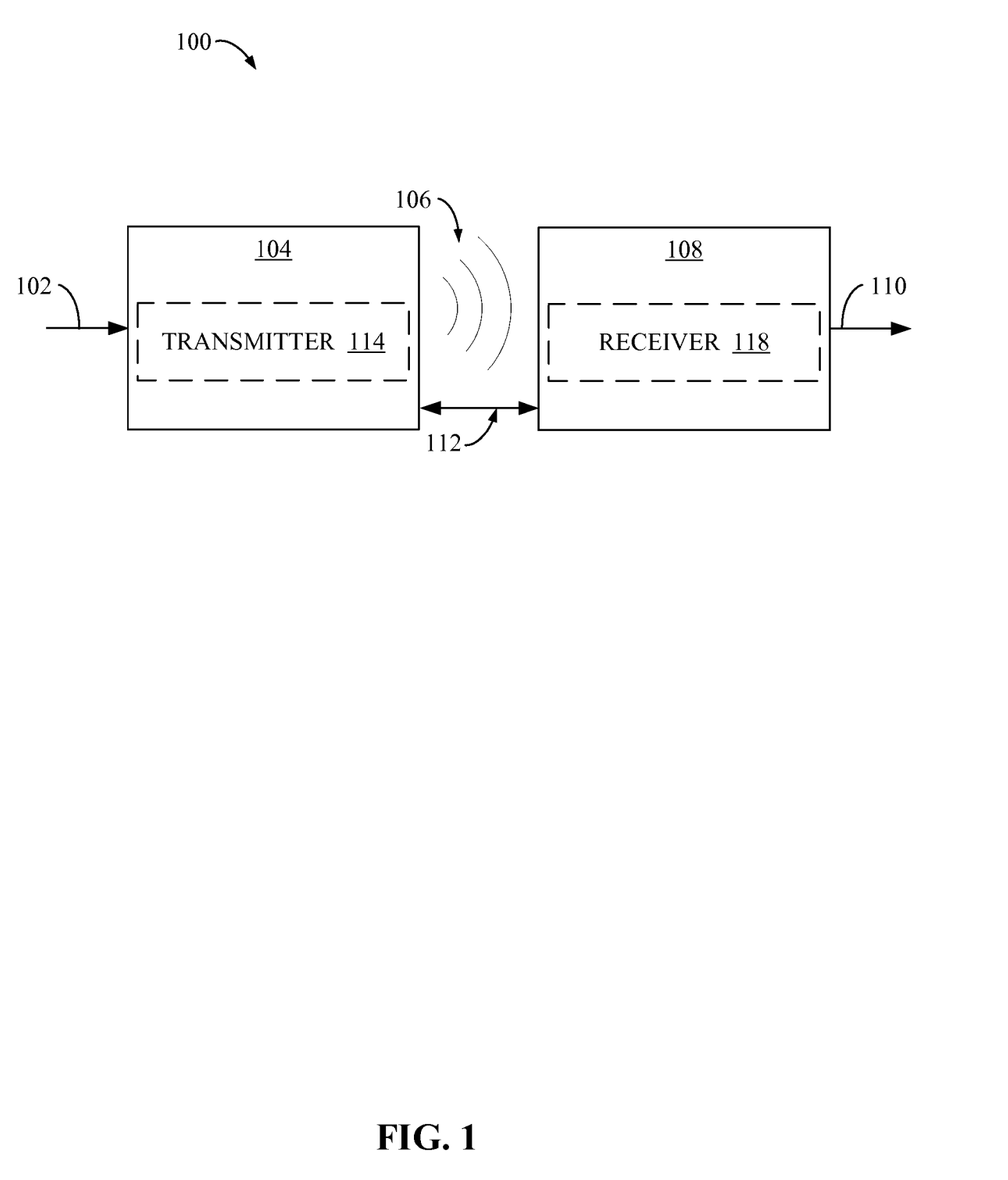
FIG. 1 is a block diagram of a wireless communication system according to an aspect.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
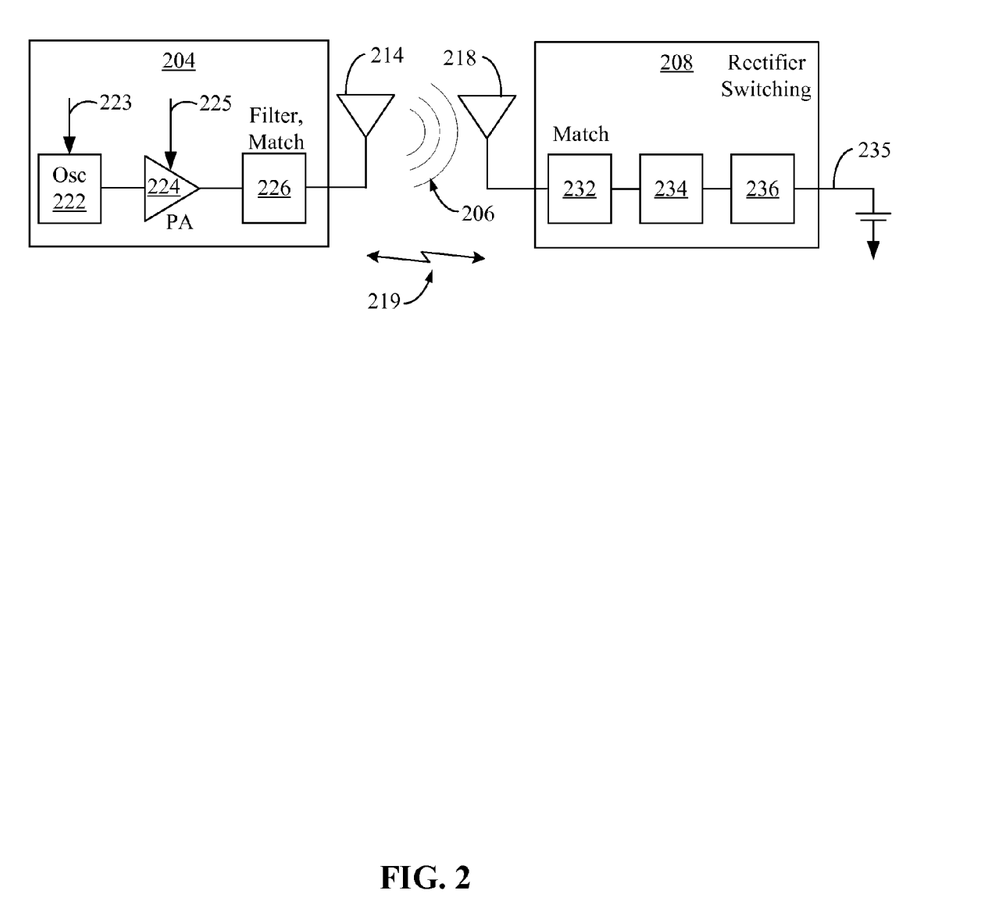
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc.).

Figure 3:
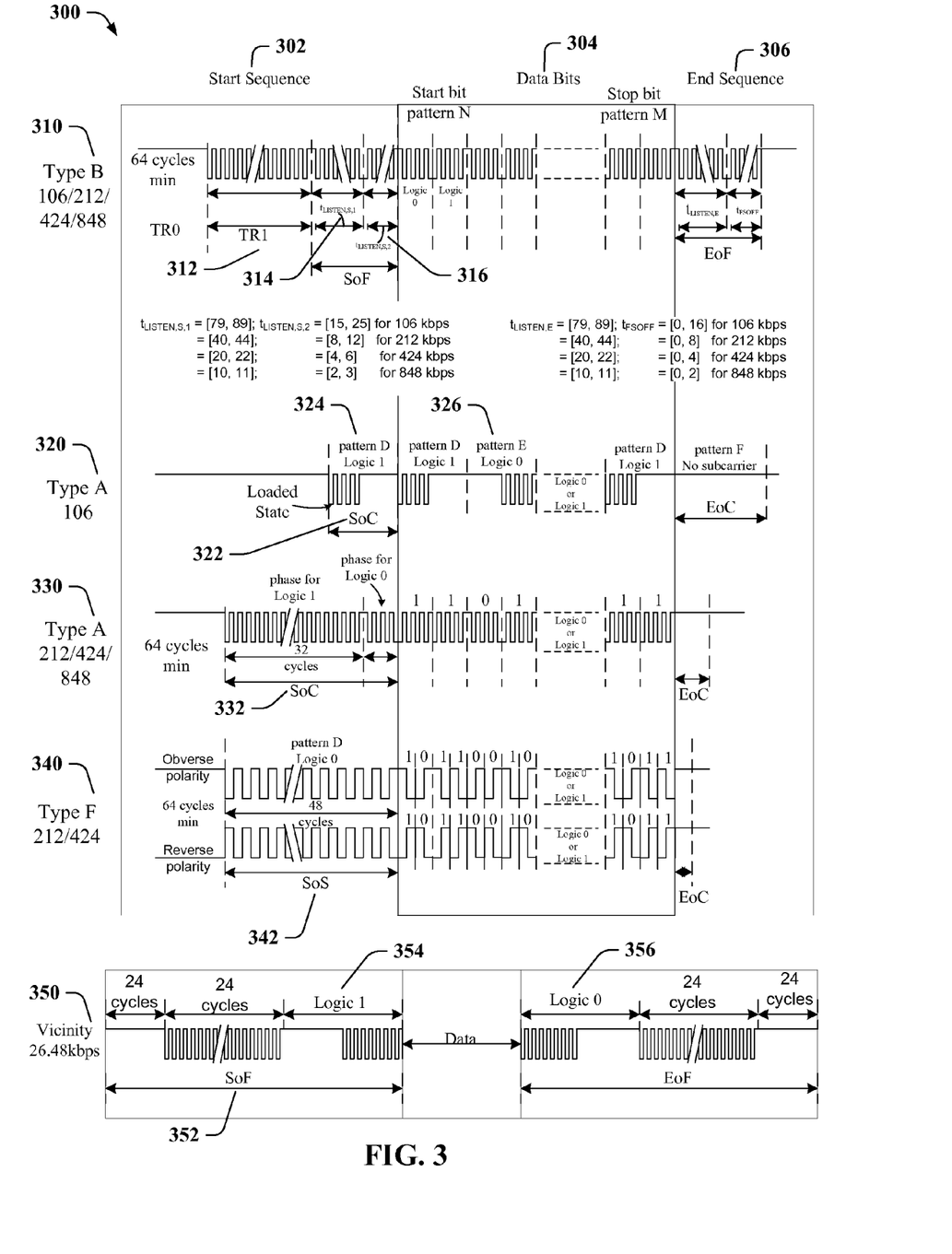
FIG. 3 is a schematic diagram of packet structures for load modulation for different NFC technology types, according to an aspect.

With reference to FIG. 3, is a schematic diagram of packet structures 300 for load modulation for different NFC technology types is illustrated. As depicted in FIG. 3, packet structures 300 for NFC communications may include a start sequence portion 302, a data bits portion 304, and an end sequence portion 306. Different NFC technology types may use patterns/sequences to indicate the end of the start sequence portion 302 and the beginning of the data bits portion 304, in which packets may be communicated. An acquisition module within an initiator NFC device may monitor the carrier signal for the known patterns/sequence. Such monitoring may be performed using a filter with coefficients that are configured to match the known pattern. Further, because of the seesaw behavior of the matched filter output, beside use of a threshold to detect the presence of the signal peak, a sliding window on local peaks (maxima) of a defined length may be used to determined the peak based on one or more criteria that the candidate local peak has to be bigger than future local peaks (in the window). When the peak is found, it may be confirmed by comparing its magnitude (and/or magnitude-squared) with a fraction of the sum of magnitude (and/or magnitude-squared) of future local peaks.

For example, with NFC type A 106 kbps 320, a packet beginning pattern may be one start of communication SoC 322 bit of logic 1 (324). In such an aspect, the matched filter coefficients may be $\{-1, 1, -1, 1, -1, 1, -1, 1\}$. Further, when the peak is found, it is confirmed by comparing its magnitude-squared with ⅞ of the sum of magnitude-squared of the first and the fourth future local peaks.

In an example, with NFC type A 212/424/848 kbps 330, a packet beginning pattern may be one SoC 332 with 32 cycles of subcarrier with phase of logic 1 and one bit duration of logic 0. Further, when the peak is found, it is confirmed by being bigger than all sixteen future local peaks (in the window).

In another example, with NFC type F 212/424 kbps 340, a packet beginning pattern may be 48 cycles of subcarrier with phase of logic 0 SoS 342 and sixteen bits of SoF. The matched filter may be configured based on thirty two bits of SoS and sixteen bits of SoF. Since the matched filter (MF) output magnitude depends on the input signal power, amplitude modulation index and $\phi_{on}$ and $\phi_{off}$ load modulation, it is difficult to determine a threshold to detect the peak of matched filter output. On the other hand, a binary matched filter output is insensitive to the above listed factors, but it does not provide good symbol timing recovery due to the fact that the input and the filter coefficients are heavily quantized. As such, the acquisition for NFC Type F 340 may be based on the combination of binary MF and regular MF. After the binary matched filter detects a peak, an acquisition module may wait for roughly a quarter of a half subcarrier to locate a trailing to the peak using matched filter by comparing the current sample with the future sample. As such, peak acquisition may occur without use of a threshold value with matched filter. In an aspect, a binary matched filter threshold may be used to optimize performance.

In another example, with NFC type B 106/212/424/848 kbps 310, a packet beginning pattern including variable length TR1 312, $T_{Listen,S1}$ 314 and $T_{Listen,S2}$ 316. Since the exact length of the reference data is unknown, the matched filter may detect the transition from TR1 312 to $T_{Listen,S1}$ 314 and to provide symbol timing and initial channel estimate. When a peak is found, it may be confirmed by comparing its magnitude-squared with the sum of magnitude-squared of the fifteenth and the sixteenth future local peaks. After timing and initial channel estimate are determined, output of Demod may be provide to a correlator to detect the end of the first start bit.

In another example, with Vicinity 350 formatting, reference data may be 24 cycles of subcarrier and one bit duration of logic 1 (354). Since there is no phase transition for the load modulation part when going from logic 1 (354) to logic 0 (356), there will be no peak at output of matched filter if we use the entire reference data as the matched filter and after SoF, the first data is logic 0 (356). Another drawback of using the entire reference data is catching up problem after detecting the SoF 352. As such, the 24 cycles of subcarrier may be used for the matched filter, with the matched filter coefficients alternating between 1 and −1. Further, because of the seesaw behavior of the matched filter output, beside use of a threshold to detect the presence of the signal peak, a sliding window on local peaks (maxima) of a defined length (e.g., 17 peaks) may be used to determined the peak based on the criterion that the candidate local peak has to be bigger than all future local peaks (in the window).

Figure 4:
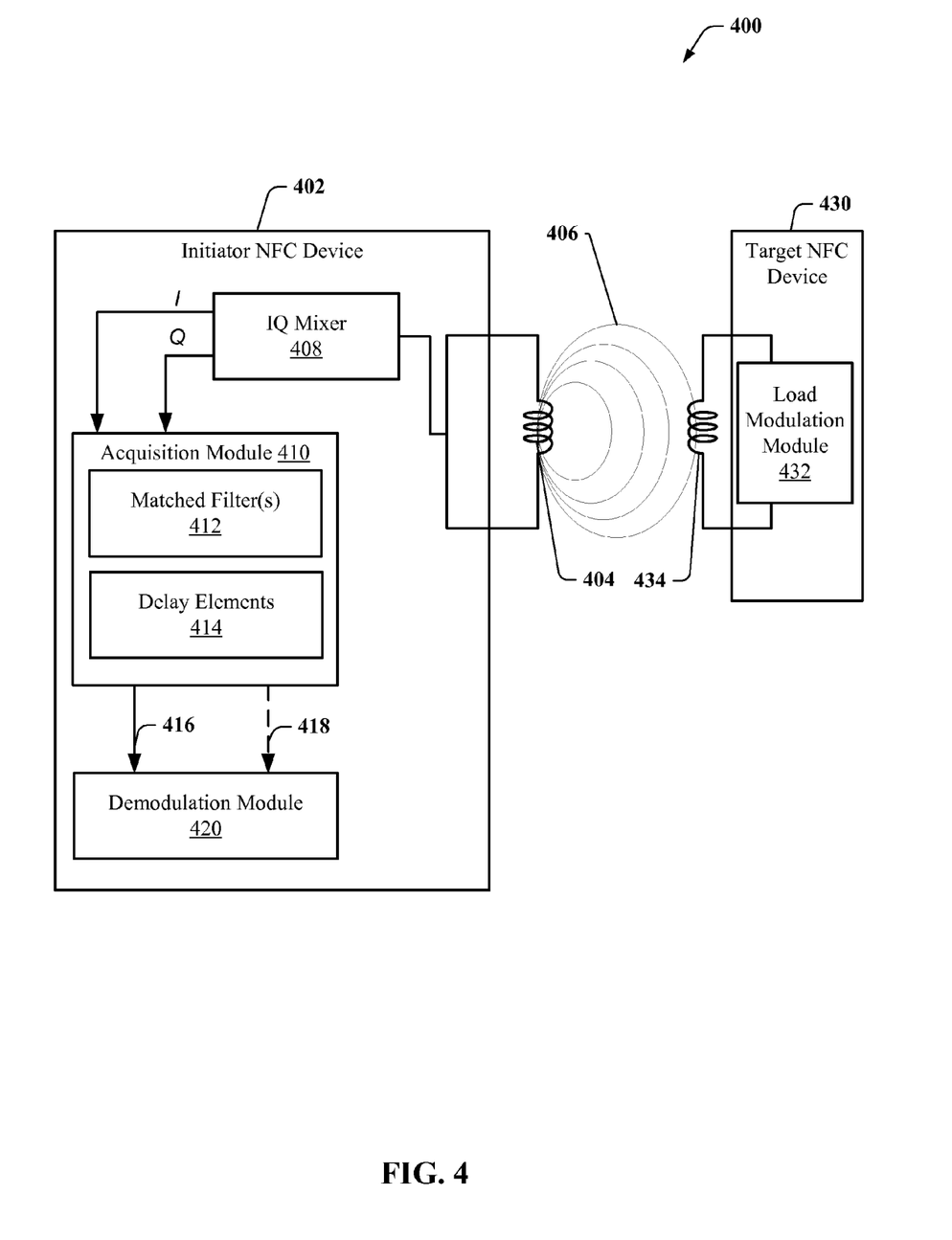
FIG. 4 is a block diagram of a NFC environment, according to an aspect.

With reference to FIG. 4, a block diagram of a communication network 400 according to an aspect is illustrated. Communication network 400 may include an initiator NFC device 402 and a target NFC device 430 that may be configured to communication using one or more of various NFC RF technology types (e.g., NFC type A, NFC type B, NFC type F).

Initiator NFC device 402 may include a NFC antenna coil 404 configured to facilitate NFC communications with target NFC device 430. As part of NFC communications, NFC antenna coil 404 may generate an electromagnetic field in the area around the NFC antenna coil 404. The strength of the field may depend on the power source and the size and number of turns in NFC antenna coil 404. Further, impedance mismatches may cause a range of amplitude/phase changes dependant on size and inductance of NFC antenna coil 404 in the magnetic field 406. Because the wavelength of the frequency used is several times greater than the close proximity distance between the NFC antenna coil 404 and the target NFC device's antenna coil 434, the electromagnetic field can be treated as an alternating magnetic field 406. This region of close proximity is referred to as the near field region. The initiator NFC device 402 and target NFC device 430 may be linked by their mutual inductance, as in a transformer, with the primary coil being the NFC antenna coil 404 and the secondary coil being the target NFC device's coil 434. Initiator NFC device 402 may communicate signals to the target NFC device 430 using an alternating magnetic field 406 that penetrates the target NFC device's coil 434 when it is in the near field region thereby inducing an alternating current in the target NFC device's coil 434. Target NFC device 430 may communicate with an initiator NFC device 402 using load modulation module 432, by switching the load (e.g., the impedance of the Target) on and off. Depending on which specification (NFC forum, ISO/IEC, ECMA and etc.) and depending on which modulation type (NFC type A, B, F, etc.), a known pattern/sequence at the beginning of a packet may be called a SoS, a SoF, or a SoC. Initiator NFC device 402 may monitor the magnetic field carrier signal for communication of a packet from target NFC device 430.

Initiator NFC device 402 may include IQ mixer 408, acquisition module 410 and demodulation module 420. In operation, IQ mixer 408 may process the monitored carrier signal into real "I" and imaginary "Q" components. Acquisition module 410 may include matched filter 412 and delay elements 414 that are configured to detect and confirm the presence of a packet beginning pattern 416. As described with respect to FIG. 3, different NFC technology types use different packet beginning patterns 416 to indicate the start of data communication. The packet beginning pattern 416 information may be provided to demodulation module 420 to allow for subsequent data communication processing. In an optional aspect, acquisition module may also provide an initiate channel estimate value 418 to demodulation module 420.

Figure 5:
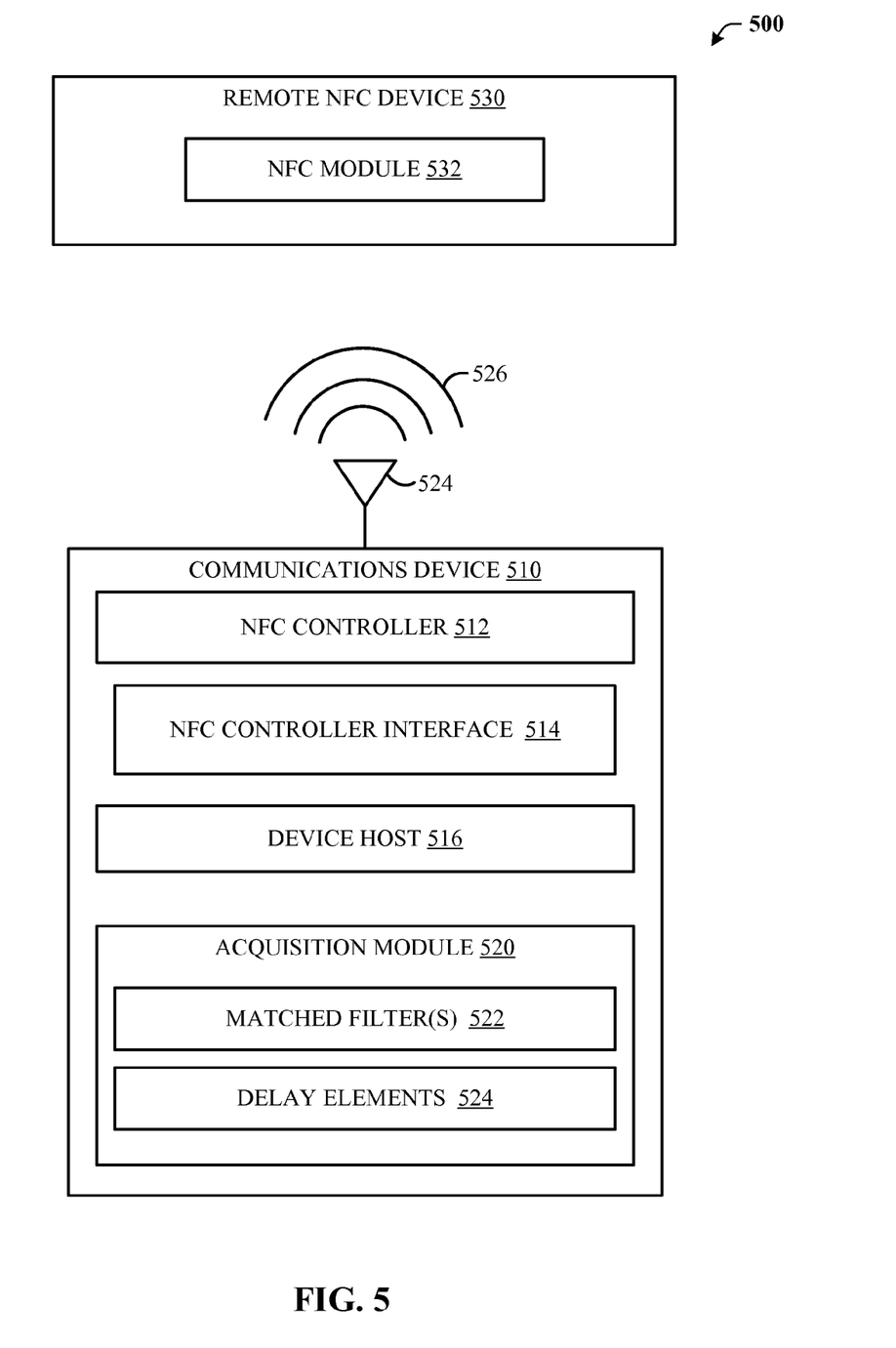
FIG. 5 is a block diagram of another NFC environment, according to an aspect.

With reference to FIG. 5, a block diagram of a communication network 500 according to an aspect is illustrated. Communication network 500 may include communications device 510 which, through antenna 524, may be in communication with a remote NFC device 530 using one or more NFC technologies 526 (e.g., NFC-A, NFC-B, NFC-F, etc.). In another aspect, communications device 510 may be configured to be connected to an access network and/or core network (e.g., a CDMA network, a GPRS network, a UMTS network, and other types of wireline and wireless communication networks).

In an aspect, communications device 510 may include a NFC controller 512, a NFC controller interface (NCI) 514, and a device host 516. In operation, device host 516 may be configured to obtain, through NCI 514, and NFC Controller 512 information from remote NFC device 530 through NFC module 532 associated with remote NFC device 530.

As part of establishing a communication link, acquisition module 520 may be configured to detect phase discontinuity that may be indicative of various packet beginning patterns. Acquisition module 520 may include one or more matched filters 522 and delay elements 524. In an aspect, matched filter 522 may detect when a portion (e.g., phase) of a monitored signal rises above a threshold value. In such an aspect, the threshold value may be adjusted to optimize packet detection during an acquisition process. In another aspect, different match filters may be used for different NFC RF technology types. Similarly, different delay element 524 values may be used for different NFC RF technology types. In such an aspect, the local peak is determined to be a peak where a magnitude value associated with the peak is greater than one or more magnitude values associated with subsequent (e.g., future) local peaks associated with delay elements 524. In another aspect, a magnitude squared value may be used for analysis. The local peak may be determined to be a peak where it is greater than the future local peaks associated with delay elements 524.

Accordingly, communication network 500 provides an environment in which a communications device 510 may be configured to improve acquisition of NFC load modulation associated with one or more NFC technology types based on local peak detection.

Figure 6:
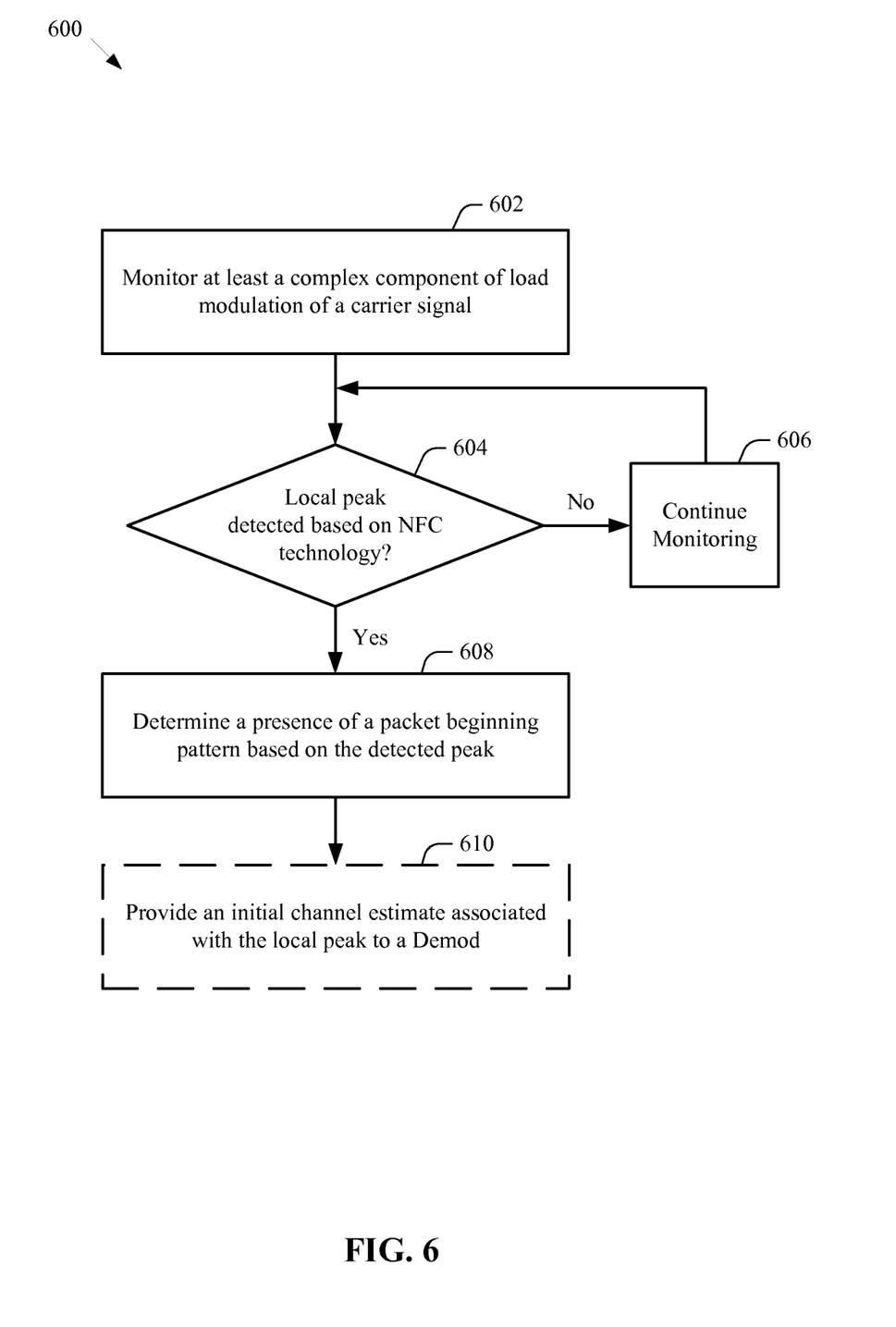
FIG. 6 is a flowchart diagram describing an example for improving acquisition for NFC load modulation, according to an aspect.

FIG. 6 illustrates a methodology in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 6, a flowchart describing an example process 600 for improving NFC signal acquisition for load modulation is illustrated.

At block 602, a NFC device may monitor at least a complex component of load modulation of a carrier signal. In an aspect, monitoring the load modulation as a complex signal allows the NFC device to utilize the phase information that may indicate phase discontinuity when the load is switching on and off.

At block 604, the NFC device may determine whether a local peak is detected. In an aspect, determining whether a peak has been detected may be based on the NFC RF technology being used. Where the initiator NFC device is using NFC-type A, a peak may be detected by detecting a plurality of local peaks above a threshold magnitude, and determining whether a peak of the plurality of local peaks has a magnitude or magnitude squared greater than a fraction of a sum of magnitude or magnitude squared of a $N^{th}$ future local peak and a magnitude or magnitude squared of a $(N+K)^{th}$ future local peak. In such an aspect, the faction may be a value such as $7/8^{th}$. Further, in such an aspect, the $N^{th}$ future local peak may be a first future local peak, and the $(N+K)^{th}$ future local peak may be a fourth future local peak. Further, the packet beginning pattern may be a SoC pattern. In another aspect, where the initiator NFC device is using NFC-type A, a peak may be detected by detecting a plurality of local peaks above a threshold magnitude, and determining whether a peak of the plurality of local peaks has a magnitude or magnitude squared greater than a magnitude or magnitude squared of any of a future set of N local peaks. In such an aspect, the future set of N local peaks may include 16 local peaks. Where the initiator NFC device is using NFC-type F, a peak may be detected using a binary matched filter associated with a threshold to trigger a matched filter. In such an aspect, the packet beginning pattern may be associated with transition between a SoS pattern and a SoF pattern. Where the initiator NFC device is using NFC-type B, a peak may be detected by detecting a plurality of local peaks above a threshold magnitude, and determining whether a peak of the plurality of local peaks has a magnitude or magnitude squared greater than a sum of magnitude or magnitude squared of a $N^{th}$ future local peak and a magnitude or magnitude squared of a $(N+K)^{th}$ future local peak. In such an aspect, the $N^{th}$ future local peak may be a $15^{th}$ local peak and the $(N+K)^{th}$ future local peak may be a $16^{th}$ local peak. Further, in such an aspect, the packet beginning pattern is associated with transition between TR1 and $T_{Listen,S1}$. In another aspect where NFC type-B is used, the NFC device may configure a Demod module to a specific mode based on the detected peak, and use the configured Demod to detect an end of a start bit for a first character. In another aspect, where the initiator NFC device is using NFC-type Vicinity, a peak may be detected by detecting a plurality of local peaks above a threshold magnitude, and determining whether a peak of the plurality of local peaks has a magnitude or magnitude squared greater than a magnitude or magnitude squared of any of a future set of N local peaks. In such an aspect, the future set of N local peaks may include 16 local peaks.

If at block 604, the NFC device determines that no local peak is detected, then at block 606, the NFC device may continue monitoring the carrier signal.

By contrast, if at block 604, the NFC device detects a local peak, then at block 608, the NFC device may determine a presence of a packet beginning pattern based on the detected peak. In an aspect, determined the packet beginning pattern may be associated with a reception of a packet from a target NFC device. In another aspect, the packet beginning pattern may be any of SoS, SoF, and/or SoC. In such an aspect, as noted above, the packet beginning packet may be based on the NFC RF technology type used during acquisition.

In an optional aspect, at block 610, the NFC device may provide an initial channel estimate associated with the local peak to a Demod subsystem. In such an aspect, such as depicted in FIG. 3, when receiving a logic 1 signal, let "b" denote the state of the first half of a subcarrier cycle, and "a" denote the state of the second half of the subcarrier cycle where "a" and "b" are complex. The channel estimate that may be used by Demod subsystem is $$\lambda = \frac{a-b}{2}.$$

Since the SoS/SoC and SoF are just sequences of subcarrier cycles (with different phases to represent logic 1 and logic 0), the matched filter coefficients, that are used as part of the acquisition process, can be selected so that the matched filter output is the channel estimate λ scaled by a factor depending at least in part on the length of the matched filter. By doing that, when the packet is determined to be detected, in block 608, an initial channel estimate may also be determined and is available for a Demod subsystem.

Figure 7:
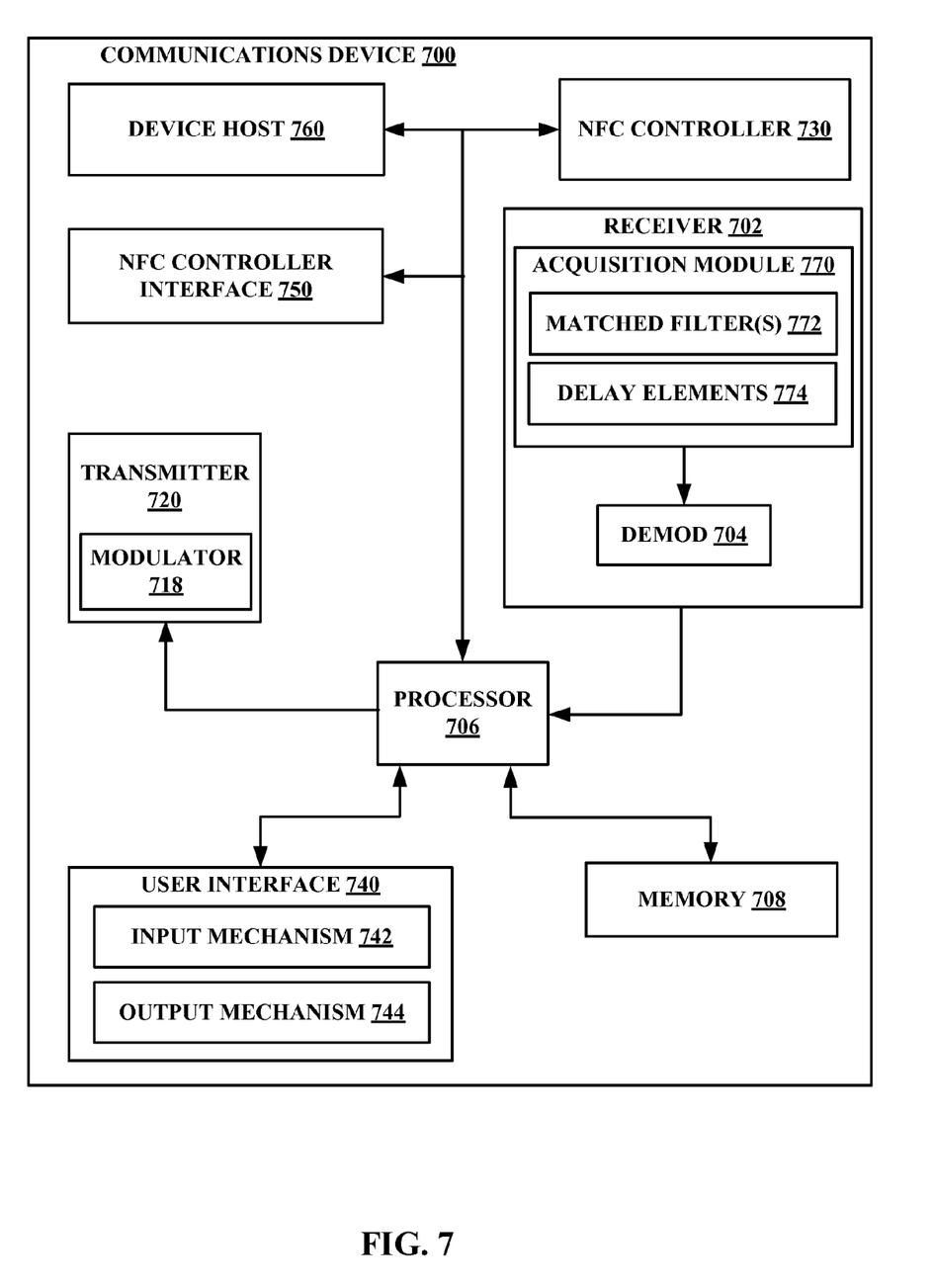
FIG. 7 is a functional block diagram example architecture of a communications device, according to an aspect.

While referencing FIG. 5, but turning also now to FIG. 7, an example architecture of communications device 700 is illustrated. As depicted in FIG. 7, communications device 700 includes receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can include a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706.

Communications device 700 can additionally include memory 708 that is operatively coupled to processor 706 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, acquisition module 770 of receiver 702 can provide means for monitoring, at least a complex component of load modulation of a carrier signal, means for detecting, using a NFC technology type specific peak detection scheme, a peak associated with at least the complex component, and means for determining a presence of a packet beginning pattern based on the detected peak. In an aspect, the packet beginning pattern may be associated with a reception of a packet from a target NFC device. Additionally or in the alternative, acquisition module 770 can provide means for providing an initial channel estimate associated with the local peak to a Demod 704.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

Communications device 700 may include NFC controller interface (NCI) 750. In an aspect, NCI 750 may be configured to enable communications between a NFC controller 730 and device host 760.

Communications device 700 may include acquisition module 770. In an aspect, the acquisition module 770 may be associated with a receiver 702. As part of establishing a communication link, acquisition module 770 may be configured to detect a packet beginning pattern indicative on communication of a packet from a remote NFC device. Acquisition module 770 may include one or more matched filters 772 and delay elements 774. In an aspect, matched filter 772 may detect when a portion (e.g., phase) of a monitored signal rises above a threshold value. In such an aspect, the threshold value may be adjusted to optimize packet detection during an acquisition process. In another aspect, different match filters may be used for different NFC RF technology types. Similarly, different delay element 774 values may be used for different NFC RF technology types. In such an aspect, the local peak is determined to be a peak where a magnitude value associated with the peak is greater than one or more magnitude values associated with subsequent (e.g., future) local peaks associated with delay elements 774. In another aspect, a magnitude squared value may be used for analysis. The local peak may be determined to be a peak where it is greater than the future local peaks associated with delay elements 774.

For example, where acquisition module 770 is configured to use NFC type A with 106 kbps, 5 delay elements 774 may be used to determine whether a local peak detected using matched filter 772 is a peak. In such aspect, the local peak may be confirmed to be a peak by comparing its magnitude-squared with 4 future local peaks and by comparing its magnitude-squared with ⅞ of the sum of magnitude-squared of the first and the fourth future local peaks. In another example, where acquisition module 770 is configured to use NFC type A with 212-848 kbps, 17 delay elements 774 may be used to determine whether a local peak detected using matched filter 772 is a peak. In such aspect, the local peak may be confirmed to be a peak by comparing its magnitude-squared with 16 future local peaks. In another example, where acquisition module 770 is configured to use NFC type F, a binary matched filter may be used to trigger use of a matched filter 772. The binary matched filter output is insensitive to the input signal power, amplitude modulation index and $\phi_{on}$ and $\phi_{off}$ of load modulation, but it does not provide comparatively good symbol timing recovery due to quantization of the input and the filter coefficients. As the binary matched filter may be constructed to be based on four bits of SoS and fifteen and a half bits of SoF, a peak detected by the binary matched filter may occur roughly half a subcarrier before the matched filter 772. As such, acquisition module 770 may use a combination of the binary matched filter and matched filter 772. In an optional aspect, after the binary matched filter detects a peak, acquisition module 770 may wait for roughly a quarter of a half subcarrier to locate a trailing to the peak using matched filter 772 by comparing the current sample with the future sample. As such, peak acquisition may occur without use of a threshold value with matched filter 772. In an aspect, a binary matched filter threshold may be used to optimize performance. In another example, where acquisition module 770 is configured to use NFC type B, 17 delay elements 774 may be used to determine whether a local peak detected using matched filter 772 is a peak. In such aspect, the local peak may be confirmed to be a peak by comparing its magnitude-squared with 16 future local peaks and by comparing it's magnitude-squared with the sum of magnitude-squared of the fifteen and the sixteenth future local peaks. In another example, where acquisition module 770 is configured to use NFC vicinity, a determination may be performed as to whether a peak of a plurality of detected local peaks, which are above a threshold, has a magnitude or magnitude squared greater than a magnitude or magnitude squared of any of a future set of N local peaks. In such an aspect, the future set of N local peaks may include 16 local peaks. further, in such an aspect, a packet beginning pattern is associated with a transition from a pattern of 24 cycles of subcarrier to a one bit duration of logic 1. Still further, in such an aspect, acquisition module 770 is configured to provide an initial channel estimate associated with the peak to Demod 704.

Additionally, communications device 700 may include user interface 740. User interface 740 may include input mechanisms 742 for generating inputs into communications device 700, and output mechanism 744 for generating information for consumption by the user of the communications device 700. For example, input mechanisms 742 may include a mechanism such as a key or keyboard, a mouse, a touch-screen display, a microphone, etc. Further, for example, output mechanism 744 may include a display, an audio speaker, a haptic feedback mechanism, etc. In the illustrated aspects, the output mechanism 744 may include a display configured to present media content that is in image or video format or an audio speaker to present media content that is in an audio format.

Figure 8:
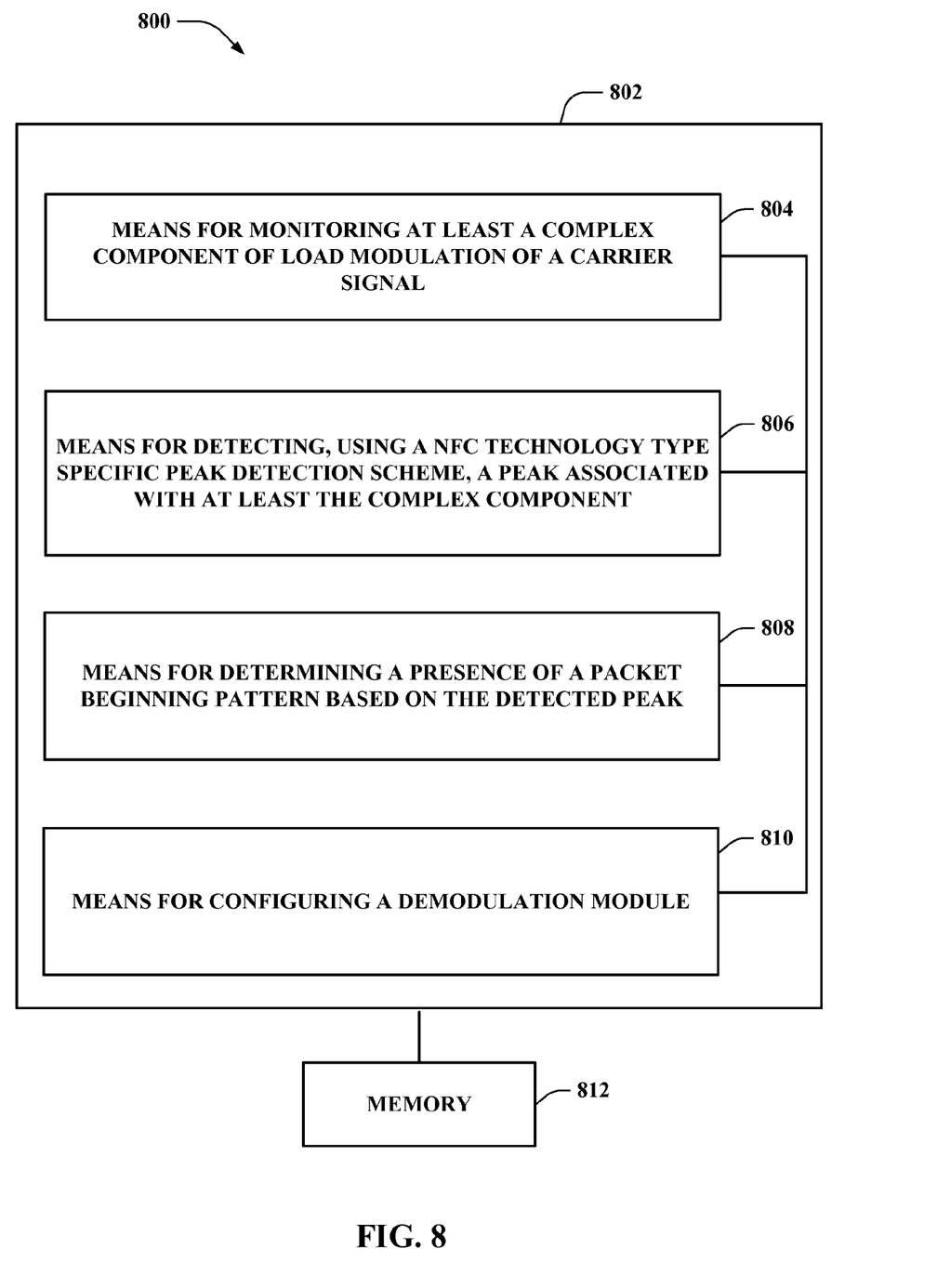
FIG. 8 is a functional block diagram of an example communication system for improving acquisition for NFC load modulation, according to an aspect.

FIG. 8 depicts another depicts a block diagram of an exemplary communication system 800 configured to improve acquisition for NFC load modulation, according to an aspect. For example, system 800 can reside at least partially within a communications device (e.g., communications device 700). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, in an aspect, logical grouping 802 can include an electrical component that may provide means for monitoring 804 at least a complex component of load modulation of a carrier signal. For example, in an aspect, the means for monitoring 804 can include receiver 702, DH 760, NFCC 730, acquisition module 770, and/or processor 706 of communications device 700.

Further, logical grouping 802 can include an electrical component that may provide means for detecting 806, using a NFC technology type specific peak detection scheme, a peak associated with at least the complex component using a NFC technology type specific peak detection scheme. For example, in an aspect, the means for processing 806 can include DH 760, NFCC 730, memory 708, acquisition module 770, and/or processor 706 of communications device 700. In an aspect in which the communications device 700 uses NFC type-A based communication protocol, the means for detecting 806 may be configured to detect a plurality of local peaks above a threshold magnitude, and determine whether a peak of the plurality of local peaks has a magnitude or magnitude squared greater than a fraction of a sum of magnitude or magnitude squared of a $N^{th}$ future local peak and a magnitude or magnitude squared of a $(N+K)^{th}$ future local peak. In such an aspect, the fraction may be ⅞. Further, in such an aspect, the $N^{th}$ future local peak may be a first future local peak, and the $(N+K)^{th}$ future local peak may be a fourth future local peak. Still further, in such an aspect, the packet beginning may be a SoC pattern. In another aspect in which the communications device 700 uses NFC type-A based communication protocol, the means for detecting 806 may be configured to detect a plurality of local peaks above a threshold magnitude, and determine whether a peak of the plurality of local peaks has a magnitude or magnitude squared greater than a magnitude or magnitude squared of any of a future set of N local peaks. In such an aspect, the future set of N local peaks may include 16 local peaks. In an aspect in which the communications device 700 uses NFC type-F based communication protocol, the means for detecting 806 may be configured to detect a peak using a binary matched filter associated with a threshold to trigger a matched filter. In such an aspect, packet beginning pattern may be associated with a transition between a SoS pattern and a SoF pattern. In an aspect in which the communications device 700 uses NFC t e-B based communication protocol, the means for detecting 806 may be configured to detect a plurality of local peaks above a threshold magnitude, and determine whether a peak of the plurality of local peaks has a magnitude or magnitude squared greater than a fraction of a sum of magnitude or magnitude squared of a $N^{th}$ future local peak and a magnitude or magnitude squared of a $(N+K)^{th}$ future local peak. In such an aspect, the $N^{th}$ future local peak may be a $15^{th}$ local peak, and the $(N+K)^{th}$ future local peak may be a $16^{th}$ local peak. Still further, in such an aspect, the packet associated with a transition between TR1 and $T_{Listen,S1}$. In an aspect in which the communications device 700 uses NFC Vicinity based communication protocol, the means for detecting 806 may be configured to detect a plurality of local peaks above a threshold magnitude, and determine whether a peak of the plurality of local peaks has a magnitude or magnitude squared greater than a magnitude or magnitude squared of any of a future set of N local peaks. In such an aspect, the future set of N local peaks may include 16 local peaks. Further, in such an aspect, the packet beginning pattern may be associated with a transition from a pattern of 24 cycles of subcarrier to a one-bit duration of logic 1.

Further, logical grouping 802 can include an electrical component that may provide means for determining 808 a presence of a packet beginning pattern based on the detected peak. For example, in an aspect, the means for processing 806 can include DH 760, NFCC 730, memory 708, acquisition module 770, and/or processor 706 of communications device 700. In an aspect, the packet beginning pattern may be associated with a reception of a packet from a target NFC device.

In another aspect, logical grouping 802 can include an electrical component that may provide means for configuring 810 a Demod module to a specific mode based on peak detected with the means for detecting 806. For example, in an aspect, the means for configuring the Demod module 810 can include DH 760, NFCC 730, memory 708, acquisition module 770, and/or processor 706 of communications device 700. In an aspect, the means for configuring the Demod module 810 may be configured to use the Demod module to detect an end of a start bit for a first character. In an aspect, the Demod module may be configured with an initial channel estimate associated with a peak detected with the means for detecting 806.

Additionally, system 800 can include a memory 812 that retains instructions for executing functions associated with the electrical components 804, 806, 808, and 810, stores data used or obtained by the electrical components 804, 806, 808, 810, etc. While shown as being external to memory 812, it is to be understood that one or more of the electrical components 804, 806, 808, and 810 may exist within memory 812. In one example, electrical components 804, 806, 808, and 810 can include at least one processor, or each electrical component 804, 806, 808, and 810 can be a corresponding module of at least one processor. Moreover, in an additional or alternative example, electrical components 804, 806, 808, and 810 may be a computer program product including a computer readable medium, where each electrical component 804, 806, 808, and 810 may be corresponding code. In an aspect, for example, memory 812 may be the same as or similar to memory 708 (FIG. 7). In another aspect, memory 812 may be associated with DH 760, NFCC 730, and/or Acquisition module 770.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

The invention claimed is:

1. A method of communications, comprising:
monitoring, by an initiator near-field communication (NFC) device using NFC-type A, at least a complex component of load modulation of a carrier signal;
detecting a plurality of local peaks above a threshold magnitude associated with at least the complex component;
determining whether a peak of the plurality of local peaks has a magnitude, or magnitude squared, greater than a fraction of a sum of magnitude, or magnitude squared, of a Nth future local peak and a magnitude, or magnitude squared, of a (N+K)th future local peak; and
determining a presence of a packet-beginning pattern based on the detected plurality of local peaks, wherein the packet-beginning pattern is associated with a reception of a packet from a target NFC device.

2. The method claim 1,
wherein the $N^{th}$ future local peak is a first future local peak,
wherein the $(N+K)^{th}$ future local peak is a fourth future local peak, and
wherein the packet beginning pattern is a start of communication (SoC) pattern.

3. A method of communications, comprising:
monitoring, by an initiator near-field communication (NFC) device using NFC-type A, at least a complex component of load modulation of a carrier signal;
detecting a plurality of local peaks above a threshold magnitude associated with at least the complex component;
determining whether a peak of the plurality of local peaks has a magnitude, or magnitude squared, greater than a magnitude, or magnitude squared, of any of a future set of N local peaks; and
determining a presence of a packet-beginning pattern based on the detected plurality of local peaks, wherein the packet-beginning pattern is associated with a reception of a packet from a target NFC device.

4. A method of communications, comprising:
monitoring, by an initiator near-field communication (NFC) device using NFC-type F, at least a complex component of load modulation of a carrier signal;
detecting a peak associated with at least the complex component, said detecting comprising:
detecting a first peak using a binary matched filter and an associated threshold, and
detecting a second peak using a matched filter, said detecting by the matched filter being triggered by the detecting of the first peak by the binary matched filter; and
determining a presence of a packet-beginning pattern based on the detected first and second peaks, wherein the packet-beginning pattern is associated with a reception of a packet from a target NFC device.

5. A method of communications, comprising:
monitoring, by an initiator near-field communication (NFC) device using NFC-type B, at least a complex component of load modulation of a carrier signal;
detecting a plurality of local peaks above a threshold magnitude associated with at least the complex component;
determining whether a peak of the plurality of local peaks has a magnitude, or magnitude squared, greater than a sum of magnitude, or magnitude squared, of a Nth future local peak and a magnitude, or magnitude squared, of a (N+K)th future local peak; and
determining a presence of a packet-beginning pattern based on the detected plurality of local peaks, wherein the packet-beginning pattern is associated with a reception of a packet from a target NFC device.

6. The method of claim 5, wherein the $N^{th}$ future local peak is a $15^{th}$ local peak, and wherein the $(N+K)^{th}$ future local peak is a $16^{th}$ local peak, and wherein the packet beginning pattern is associated with transition between TR1 and $T_{Listen,S1}$.

7. A method of communications, comprising:
monitoring, by an initiator near-field communication (NFC) device using NFC-type Vicinity, at least a complex component of load modulation of a carrier signal;
detecting a plurality of local peaks above a threshold magnitude associated with at least the complex component;
determining whether a peak of the plurality of local peaks has a magnitude, or magnitude squared, greater than a magnitude, or magnitude squared, of any of a future set of N local peaks; and
determining a presence of a packet-beginning pattern based on the detected plurality of local peaks, wherein the packet-beginning pattern is associated with a reception of a packet from a target NFC device.

8. An apparatus for communication, comprising:
a memory;
a processor coupled to the memory;
an acquisition module coupled to at least the processor and configured to:
monitor, using NFC-type A, at least a complex component of load modulation of a carrier signal;
detect a plurality of local peaks above a threshold magnitude associated with at least the complex component,
determine whether a peak of the plurality of local peaks has a magnitude, or magnitude squared, greater than a fraction of a sum of magnitude, or magnitude squared, of a Nth future local peak and a magnitude, or magnitude squared, of a (N+K)th future local peak; and
determine a presence of a packet-beginning pattern based on the detected plurality of local peaks, wherein the packet-beginning pattern is associated with a reception of a packet from a target NFC device.

9. The apparatus of claim 8,
wherein the $N^{th}$ future local peak is a first future local peak,
wherein the $(N+K)^{th}$ future local peak is a fourth future local peak, and
wherein the packet beginning pattern is a start of communication (SoC) pattern.

10. An apparatus for communication, comprising:
a memory;
a processor coupled to the memory;
an acquisition module coupled to at least the processor and configured to:
monitor, using NFC-type A, at least a complex component of load modulation of a carrier signal;
detect a plurality of local peaks above a threshold magnitude associated with at least the complex component;
determine whether a peak of the plurality of local peaks has a magnitude, or magnitude squared, greater than a magnitude, or magnitude squared, of any of a future set of N local peaks; and
determine a presence of a packet-beginning pattern based on the detected plurality of local peaks, wherein the packet-beginning pattern is associated with a reception of a packet from a target NFC device.

11. An apparatus for communication, comprising:
a memory;
a processor coupled to the memory;
an acquisition module coupled to at least the processor and configured to:
monitor, using NFC-type F, at least a complex component of load modulation of a carrier signal;
detect a peak associated with at least the complex component, the acquisition module being further configured to:
detect a first peak using a binary matched filter and an associated threshold
detect a second peak using a matched filter, the detection by the matched filter being triggered by the detection of the first peak by the binary matched filter; and
determine a presence of a packet-beginning pattern based on the detected plurality of local peaks, wherein the packet-beginning pattern is associated with a reception of a packet from a target NFC device.

12. An apparatus for communication, comprising:
a memory;
a processor coupled to the memory;
an acquisition module coupled to at least the processor and configured to:
monitor, using NFC-type B, at least a complex component of load modulation of a carrier signal;
detect a plurality of local peaks above a threshold magnitude associated with at least the complex component;
determine whether a peak of the plurality of local peaks has a magnitude, or magnitude squared, greater than a sum of magnitude, or magnitude squared, of a Nth future local peak and a magnitude, or magnitude squared, of a (N+K)th future local peak; and
determine a presence of a packet-beginning pattern based on the detected plurality of local peaks, wherein the packet-beginning pattern is associated with a reception of a packet from a target NFC device.

13. The apparatus of claim 12, wherein the Nth future local peak is a 15th local peak, and wherein the (N+K)th future local peak is a 16th local peak, and wherein the packet beginning pattern is associated with transition between TR1 and $T_{listen,S1}$.

14. An apparatus for communication, comprising:
a memory;
a processor coupled to the memory;
an acquisition module coupled to at least the processor and configured to:
monitor, using NFC-Vicinity, at least a complex component of load modulation of a carrier signal;
detect a plurality of local peaks above a threshold magnitude associated with at least the complex component;
determine whether a peak of the plurality of local peaks has a magnitude, or magnitude squared, greater than a magnitude, or magnitude squared, of any of a future set of N local peaks; and
determine a presence of a packet-beginning pattern based on the detected plurality of local peaks, wherein the packet-beginning pattern is associated with a reception of a packet from a target NFC device.

\* \* \* \* \*